(12) United States Patent
Marty et al.

(10) Patent No.: US 9,777,238 B2
(45) Date of Patent: Oct. 3, 2017

(54) REACTOR FOR DRYING AND TORREFYING A BIOMASS, PREFERABLY A LIGNOCELLULOSE BIOMASS

(71) Applicant: COMMISSARIAT A L'ENERGIE ATOMIQUE ET AUX ENE ALT, Paris (FR)

(72) Inventors: Charlotte Marty, Saint Martin d'Uriage (FR); Thierry Chataing, Lans-en-Vercors (FR)

(73) Assignee: Commissariat à l' énergie atomique et aux énergies alternatives, Paris (FR)

( * ) Notice: Subject to any disclaimer, the term of this patent is extended or adjusted under 35 U.S.C. 154(b) by 314 days.

(21) Appl. No.: 14/356,007

(22) PCT Filed: Nov. 8, 2012

(86) PCT No.: PCT/EP2012/072163
§ 371 (c)(1),
(2) Date: May 2, 2014

(87) PCT Pub. No.: WO2013/068480
PCT Pub. Date: May 16, 2013

(65) Prior Publication Data
US 2014/0298716 A1    Oct. 9, 2014

(30) Foreign Application Priority Data
Nov. 9, 2011   (FR) .................................... 11 60205

(51) Int. Cl.
*C10B 49/04*      (2006.01)
*C10L 5/44*       (2006.01)
(Continued)

(52) U.S. Cl.
CPC ............... *C10L 5/447* (2013.01); *B01J 8/125* (2013.01); *C10B 49/04* (2013.01); *C10B 53/02* (2013.01);
(Continued)

(58) Field of Classification Search
CPC ......... C10B 49/04; C10B 53/02; C10L 9/083; C10L 5/44; C10L 5/442; C10L 5/445
See application file for complete search history.

(56) References Cited

U.S. PATENT DOCUMENTS 3,660,225 A    5/1972   Verreyne et al.
3,742,735 A    7/1973   Verreyne et al.
(Continued)

FOREIGN PATENT DOCUMENTS

DE    199 41 497 A1    3/2001
EP    2 189 512 A1     5/2010

OTHER PUBLICATIONS

International Search Report dated Jan. 28, 2013, in PCT/EP12/072163 filed Nov. 8, 2012.
(Continued)

*Primary Examiner* — Jonathan Miller
(74) *Attorney, Agent, or Firm* — Oblon, McClelland, Maier & Neustadt, L.L.P.

(57) ABSTRACT

A reactor for drying and torrefaction, configured for torrefying biomass, including a chamber in which two separate areas are delimited, a mechanism for mixing and transferring biomass from one end of the chamber to the other, a drying device in an upstream area of the chamber configured to dry the biomass introduced into the reactor, a torrefaction device in a downstream area of the chamber configured to torrefy biomass dried in the upstream area, and a transfer and sealing system configured to allow dried biomass to be transferred from the upstream area to the downstream area
(Continued)

at time intervals, and to make the two areas mutually sealed during each interval. Such a reactor may, for example, find application to torrefaction of lignocellulosic biomass.

18 Claims, 3 Drawing Sheets

(51) Int. Cl.
  *C10B 53/02* (2006.01)
  *B01J 8/12* (2006.01)
  *C10L 9/08* (2006.01)
(52) U.S. Cl.
  CPC ....... *C10L 9/083* (2013.01); *C10L 2200/0469* (2013.01); *C10L 2270/04* (2013.01); *C10L 2290/08* (2013.01); *C10L 2290/56* (2013.01); *Y02E 50/10* (2013.01); *Y02E 50/14* (2013.01); *Y02E 50/15* (2013.01); *Y02E 50/30* (2013.01)

(56) References Cited

U.S. PATENT DOCUMENTS

| | | | | |
|---|---|---|---|---|
| 8,161,663 | B2* | 4/2012 | Weisselberg | C10L 9/083 202/109 |
| 8,266,812 | B2* | 9/2012 | Weisselberg | C10L 9/083 110/218 |
| 8,266,821 | B2* | 9/2012 | Weisselberg | C10L 9/083 110/219 |
| 8,276,289 | B2* | 10/2012 | Causer | C10B 49/02 122/22 |
| 8,322,056 | B2* | 12/2012 | Causer | C10B 49/02 122/22 |
| 8,549,769 | B2* | 10/2013 | Weisselberg | C10L 9/083 110/218 |
| 9,062,255 | B2* | 6/2015 | DePouli | C10B 7/02 |
| 2010/0083530 | A1 | 4/2010 | Weisselberg et al. | |
| 2010/0242351 | A1 | 9/2010 | Causer | |
| 2012/0233914 | A1 | 9/2012 | Causer | |
| 2014/0305033 | A1 | 10/2014 | Chataing | |

OTHER PUBLICATIONS

French Search Report dated May 2, 2012, in French Application No. 11 60205 filed Nov. 9, 2011.
French Preliminary Search Report dated May 9, 2012, in French Patent Application No. 1160205 with English translation of category of cited documents.

* cited by examiner

REACTOR FOR DRYING AND TORREFYING A BIOMASS, PREFERABLY A LIGNOCELLULOSE BIOMASS

TECHNICAL FIELD

The invention relates to a new reactor for drying and torrefying a biomass, preferably a lignocellulosic biomass.

PRIOR ART

Against a background of ever-increasing consumption, exploitation of biomass is envisaged to diversify energy resources. Sectors involving thermal conversion by gasifying and combustion are particularly envisaged.

Torrefaction of preferably lignocellulosic biomass is a step of pretreatment of biomass with a view to injecting it in a powder form in an entrained flow reactor (gasifying reactor) or in a reactor called a biomass and coal co-firing reactor in a coal-fired power station. Indeed, the fibrous and elastic structure of biomass makes micronisation of it highly energy consuming, and gives the ground product characteristics which are unsuitable for injection in powder form. Torrefaction is a mild thermal treatment of biomass between drying and pyrolysis, which is generally undertaken at temperatures of between 200 and 300° C., and which seeks to eliminate the water and to modify a proportion of the organic matter of the biomass in order to break its fibres. In other words, this mild thermal treatment alters the fibrous structure of the biomass, by this means then facilitating grinding of it and injection of it into a gasifying or co-firing reactor.

Pretreatment by torrefaction also improves the properties of the biomass with a view to its storage, in particular by giving it a hydrophobic character, and resistance to biological degradation. Granulation is also a possible application after torrefying the material.

As mentioned above, since diversification of energy resources has become a major challenge it is important to exploit as much as possible of the available biomass resources, and this relates in particular to those located in geographically isolated areas. However, forest managers and farmers are currently facing problems relating to storage of biomass, due to its hydrophilic and biodegradable character. The costs relating to shipment of the material are also generally non-negligible.

At the current time there is no method whereby biomass can be pretreated by torrefaction in geographically isolated zones, where the resource is abundant. The development of a transportable unit would allow decentralised biomass treatment, to improve on-site storage and subsequent shipment.

Several known torrefaction technologies enable lignocellulosic biomass to be torrefied, but they are not necessarily industrialised/industrialisable. Rotary furnaces, multiple-stage furnaces, skelp furnaces, screw furnaces or fluidised beds may be mentioned in particular.

However, existing torrefaction technologies face a number of problems, and in particular difficulties of the following types:
  smoke treatment: this step, which combines management of effluents relating to the natural moisture of the material to be treated, and management of the effluents relating to the torrefaction reactions, is often costly and affects the overall economy of the method,
  uniformity of the heat treatment for the biomass: poor homogeneity of the temperature in the furnace, and low heat exchanges can lead to inhomogeneity of the inter- and intra-particle heat treatment.

It seems to be accepted that to be able to use a torrefaction reactor as a unit which can be transported to geographically isolated zones a reactor must be produced with a drying and torrefaction area in a single reactor chamber.

Application EP 2 189 512 A1 discloses a biomass drying and torrefaction reactor of the multiple-stage furnace type, in which the first stages (1 to N−1) are used for forced drying of the biomass, while a single stage N is used solely for the entire torrefaction step proper, and downstream stages N+1 to $N_0$ are used for cooling by mist propagation of the dried and torrefied biomass. The solution according to this application therefore allows staged treatment of the effluents, since the steam resulting from drying the wood can be extracted in stage N−1 and the smoke released by the torrefaction can be extracted in stage N.

The torrefaction parameters (temperature and residence time) are also controlled firstly by online gas analyses in different stages of the furnace and, secondly, by detection using a pyrometer of the exothermic reactions, which is representative of a certain state of progress of the torrefaction. Gas analyses have the major disadvantage that they require expensive facilities which are difficult to install.

For its part, the detection phase is based on digital simulations, the results of which must be considered with caution, due to the fact that the intra-particle reactions occurring during torrefaction are still poorly understood, and that they can differ from one species to another.

In addition, according to this patent application the entire torrefaction operation occurs on a single stage of the furnace, which poses risks in terms of the homogeneity of the heat treatment, since mixing is not necessarily accomplished uniformly in a single stage in this type of furnace.

Finally, energy optimisation is not considered, and use of mist cannons in the last stages of the furnace has disadvantages in terms of energy cost (a proportion of the misted water will vaporise) and of treatment of the effluents, since there is an additional fraction of vapour to be treated.

Patent application US 2010/0083530A1 proposes a method for torrefaction in a multiple-stage furnace, in which drying is accomplished at the top of the furnace, and torrefaction at the base of the furnace. This patent application re-uses the steam generated by drying the moist material to transfer heat into the furnace, and to make the atmosphere inert in the furnace chamber. The smoke in the chamber containing steam is extracted from the furnace in the upper part or at one or more points. A proportion of this smoke can be condensed, and a proportion is superheated in a heat exchanger before being reinjected at one or more levels in the reactor. The energy is transferred to the heat exchanger by the smoke which is uncondensed at the outlet of the condenser, and which passes through a burner supplied with supplementary fuel. Although this solution proposes improvements for controlling the method and for treating the effluents, it nonetheless has several disadvantages, as follows.

Firstly, the concentration of smoke recycled in the furnace as water and volatile material is highly dependent on the nature of the wood and also on its basic moisture. To manage the quantities of gas to be recycled in the furnace, or to be sent to the condenser, with the aim of limiting the concentration of volatile material in the chamber of the furnace, online analyses of composition of the gases are required, which implies implementation difficulties and substantial costs.

Firstly, treatment of the effluents can be costly due to the condensation of a proportion of the smoke: the condensed effluents, containing acidic volatile materials, can require treatment before discharge, according to the regulations in force.

Condensation of the volatile materials also constitutes an energy loss: their calorific power is not exploited.

In addition, the steam can cause hydrolysis reactions in the wood, which has an impact on torrefaction and loss of mass. These reactions are poorly understood, and depend on the nature of the wood, which complicates still further control of the quality of the product.

Further, a sprinkling of the biomass particles at the base of the furnace is envisaged, by injection of a liquid such as water. However, injection of water in liquid form can cause consequent corrosion problems in the furnace, and can also lead to an energy loss.

Finally, having the gases flow in the opposite direction of the solid biomass which, for its part, flows from top to bottom, poses the risk that volatile materials and steam can condense in the reactor platform positioned furthest upstream, by contact with the cold material injected into the furnace.

The aim of the invention is therefore to propose a reactor for drying and torrefying biomass which compensates for all or some of the disadvantages of the abovementioned prior art and which, if applicable, can be used as a unit which can be transported to geographically isolated areas.

A particular aim of the invention is to propose a reactor for drying and torrefying biomass which overcomes the difficulties in treating effluents (smoke) and of uniformity of thermal treatment for the biomass of currently existing torrefaction technologies.

Another aim of the invention is to propose a reaction for drying and torrefying biomass which can be used as a transportable unit with dimensions meeting the European transport standards applicable to semitrailer lorries, i.e. with a maximum diameter of 2.55 m and a maximum height of 4.30 m.

DESCRIPTION OF THE INVENTION

To accomplish this, the invention relates to a drying and torrefaction reactor, intended for torrefying biomass, including a chamber in which two separate areas are delimited, together with means for mixing and transferring biomass from one end of the chamber to the other, where the upstream area of the chamber includes drying means able to dry the biomass introduced into the reactor, and where the downstream area of the chamber includes torrefaction means able to torrefy biomass dried in the upstream area.

According to the invention, the reactor includes a transfer and sealing system able to allow dried biomass to be transferred from the upstream area to the downstream area at time intervals, and to make the two areas mutually sealed during each interval.

The term biomass is understood to have its habitual meaning, i.e. all organic material of vegetal or animal origin. In particular, biomass can be of a lignocellulosic type, such as wood and agricultural matter, and can have any moisture rate, preferably containing between 10 and 60% of water, and can be introduced into the reactor according to the invention in all varieties of forms, such as wafers, granules, etc.

According to the invention the reactor also includes heating means in its torrefaction area and/or in its drying area.

In the upstream area (drying area), the temperature can be between 100 and 300° C., and more particularly between 100 and 200° C. Indeed, above 200° C. the reactions which take place are no longer only drying reactions, and there is an increased risk that the tar concentration will increase in the effluents produced in this area.

In the downstream area (torrefaction area), the temperature is between 200 and 300° C. The temperature is more preferably between 250 and 300° C. for biomass of the wood type, and between 220 and 280° C. for biomass of the agricultural type. Indeed, wood reacts at higher temperatures than agricultural biomasses.

As defined, the invention allows simultaneously uniform treatment of the biomass through an optimisation of the heat exchanges, and optimised treatment of the effluents relating to torrefaction.

It is also possible to envisage using the reactor according to the invention as a unit which can be transported to geographically isolated areas, allowing thermal treatment of biomass, preferably lignocellulosic biomass, at temperatures of between 200 and 300° C., in reduced oxygen conditions.

The heating means can include one or more heat pipes.

The reactor according to the invention defines two separate treatment areas which are sealed relative to one another, in terms of the gases, allowing simultaneously:

the biomass to be treated in a staged manner, by accomplishing a first drying step and a second torrefaction step, control of the treatment temperature between the two areas of the reactor to be facilitated, since drying is generally implemented at a temperature below that of torrefaction, a treatment to be undertaken with a different co-current or counter-current configuration between the gas and the solid biomass, depending on the area of the reactor, and by this means the nature of the gaseous atmosphere in contact with the biomass to be controlled. Indeed, flowing against the current in air or in steam in the drying area (upstream area) enables the heat exchanges to be optimised. Conversely, flowing with the current in the torrefaction area (downstream area) is preferable. Indeed, in this downstream area, flowing against the current poses risks, firstly that volatile materials (tars, acids, etc.) can condense on the biomass entering the torrefaction area at the temperature of the drying area, and secondly of reactions between the condensed phase (charged with tar, acids, etc.) and the solid biomass, due to the nature of the gaseous atmosphere and the presence of acids which can affect the torrefaction reactions, resulting in a loss of control of the quality of torrefaction. The torrefaction can be accomplished advantageously in an inert atmosphere consisting of gases such as combustion gases ($N_2$, $CO_2$, $H_2O$, etc.). By this means the transfer and sealing system according to the invention installed in a reactor enables the gases to flow against the current in the drying area and with the current in the torrefaction area, management of the effluents and the thermal efficiency of the method to be facilitated: due to the separation of the drying and torrefying areas, the steam released by the drying of the biomass is not "polluted" by the volatile compounds released from the biomass during torrefaction and is therefore easier to treat. There is thus no requirement for the steam released in the drying part to be sent to a post-treatment area. This enables energy consumption relating to the heating of the steam to the temperature of the post-combustion area to be avoided.

According to one advantageous embodiment, the reactor according to the invention consists of a multiple-stage furnace where each stage i is defined by a fixed platform (Pi) in which at least one opening is made, called the transfer opening, where the means for mixing and transferring the biomass consist of multiple arms fitted with vanes able to mix and move the biomass on each fixed platform along a spiral-shaped trajectory as far as the transfer opening through which the biomass can flow under gravity. The distance between two consecutive fixed platforms is preferably between 200 and 700 mm. The heating means are able to heat the platform uniformly (temperature isotherm). Since a heat pipe is present the platform can be heated in a uniform manner, enabling the temperature and the residence time to be controlled.

Control of the biomass torrefaction temperature is a very important parameter: a temperature variation has a great impact on the mass loss of the solid. Heat exchanges with the particle bed occur due to phenomena of convection, conduction and radiation with the gases, the walls and the platforms. To provide fine temperature control, and to homogenise in the torrefaction area, an inlet enabling a proportion of the recycled torrefaction gases to be injected is located at each stage of the furnace.

The inlet is coupled to a heat exchange optimisation system. This consists of a heat-conducting element connecting the wall of the furnace and the hearth of the furnace, which is heated by the hot gases arriving through the inlet located in each stage, and which defuses this heat towards the centre of the furnace. Then heat-conducting element can advantageously be a heat pipe, since such devices have higher thermal conductivity (20 to 100 times) than the habitual metals, and by this means improve the exchanges in the furnace by conduction, convection and radiation. One or more heat pipes can be positioned in each platform.

The reactor thus advantageously includes at least one heat pipe element held inside a V-shaped groove made in at least one fixed platform defining a stage.

In other words, the temperature of the gases and of the platforms is precisely controlled, and the heat exchanges with the particle bed are controlled and optimised (maximisation of the exchange surface).

In particular this enables the residence times in the furnace, which for torrefaction are generally between 20 and 90 min., to be reduced. Thus, by virtue of the invention, residence times can be reduced to a value of 10 to 30 min. due to a managed temperature increase, coupled with an optimisation of the heat exchanges. Indeed, the residence time/temperature pair determines the mass loss of the solid and the level of degradation of the compounds of the biomass. An increase in the temperature enables the residence time to be reduced.

When the biomass is fed in continuously there must also be optimised heat exchanges, in order for the heat treatment to remain uniform in the context of a use with a high temperature and a short residence time.

The materials constituting all the components of the furnace according to the invention can be of the ceramic, metal or other types. A material also provides insulation for the furnace's outer casing.

If the reactor according to the invention is used as a fixed installation the choice is advantageously made to use ceramic materials, which have the major advantage that they resist corrosion, in particular corrosion relating to the acids released during torrefaction.

When the reactor according to the invention is used as a transportable unit, it is important to bear in mind the weight-related constraints, in order that it can be transported on a semitrailer, preferably complying with the relative European standards. In this case it is therefore advantageous to prefer metal alloys. Similarly, a transportable unit must be designed to tolerate frequent stoppages and starts (i.e. resistance against thermal cycles). When the furnace is stopped there is a risk of condensation of the torrefaction smoke, and therefore of corrosion of the metal platform by the acids formed during torrefaction. To prevent this, flushing with hot gases is advantageously applied when the supply of biomass to the furnace is stopped. Areas for condensation and for recovery of the condensed fraction can also be included. Channels can thus be installed in the ceramic material, or in another non-corrosive material, at the periphery of the furnace platforms in the torrefaction area where the liquids condense when cooling. An outlet tap, notably in the drying part of the furnace, where there is substantial water relating to the moisture of the wood, then enables the effluents condensed in the chamber to be evacuated.

When the reactor according to the invention is a multiple-stage furnace, fixed platform Pi advantageously consists of two plates superposed on one another, and separated from one another by a V-shaped brace, the inside of which constitutes the groove.

According to one particularly advantageous embodiment the transfer and sealing system is a rotary feeder including:
an upstream platform, fixedly mounted in the chamber, and positioned at the lower end of the upstream area, and including at least one opening, called a transfer opening;
a downstream platform, fixedly mounted on a shaft, which is itself installed such that it can rotate in the chamber, and positioned at the upper end of the downstream area, and also including at least one opening, called a transfer opening;
in which a transfer opening of the upstream platform can face a transfer opening of the downstream platform at time intervals which are dependent on the speed of rotation of the rotary shaft.

The distance, depending on the height of the chamber between the upstream platform and the downstream platform, is preferably between 1 and 5 mm. This distance clearly depends on the type of biomass, and typically for biomass of the straw type this distance is increased such that it is equal, at minimum, to 6 mm.

Also preferably, the upstream and downstream platforms have the same number of transfer openings, where all these with those of the upstream platform are positioned roughly directly above those of the downstream platform.

The invention also relates to a biomass treatment installation including a reactor as described above, characterised in that it includes a first fluid circuit, with means, respectively, to inject air or steam at the lower end of the upstream area, to cause the air or the injected steam to flow against the current of the biomass in the upstream area, to recover it at its upper end, and to discharge it into the atmosphere.

The means advantageously include at least one opening, called the injection opening, made in the peripheral wall of the reactor at the lower end of the upstream area, at least one ventilator able to cause the air or injected steam to flow against the current of the biomass in the upstream area, and at least one opening, called the discharge opening, made in the peripheral wall of the reactor at the lower end of the upstream area.

To optimise effluent management, the chamber of the torrefaction furnace can preferably be made inert by recycling at least a proportion of the torrefaction gases after they have been through a combustion step. These are then extracted at the base of the furnace and then conveyed into a combustion chamber, where the volatile materials are destroyed by combustion, and their calorific capacity exploited; the combustion gases are then reinjected into the furnace after passing through a heat exchanger.

The combustion chamber therefore has several functions, namely:
- to eliminate the volatile materials produced during torrefaction in order to make the gases which are to be recycled in the torrefaction chamber inert,
- to exploit the calorific capacity of the volatile materials produced during torrefaction,
- to transfer the heat in the reactor chamber required for torrefaction and drying, At the outlet of the combustion chamber the smoke is sent to the heat exchanger, and then a proportion at least is reinjected into one or more stages of the furnace. Another proportion can be discharged into the atmosphere, after having been subject to adequate treatment steps according to the legislation in force.

To provide the energy required for drying and torrefaction, supplementary fuel can be required in the combustion chamber. This fuel can be of the natural gas, coal, biomass or oil type, or of another type.

If the reactor according to the invention is used as a transportable unit, and must therefore be autonomous, the combustion chamber can include at least one combination burner, and thus be supplied simultaneously with a solid supplementary fuel, for example biomass or charcoal. These solid fuels have the advantages that they can easily be stored (for example in a silo) and easily be transported, which enables the reactor according to the invention to have energy independence. As a combination burner which can be used in connection with the invention, those sold by the company Leroux et Lotz Technologie may be mentioned.

The heat exchanger, for its part, is fed on one side by the gases from the combustion chamber, and from the other side by the gases used to dry the biomass in the reactor's upstream area. The gases injected into the drying area (upstream area) can be air or steam originating from the drying of the biomass.

The installation according to the invention thus includes a second fluid circuit with means, respectively, to recover the gases at the lower end of the downstream area, to cause combustion of the recovered gases, to reinject at least a proportion of the combustion gases into the upper end of the downstream area, and to cause the gases to flow with the current of the biomass in the downstream area.

The means advantageously include at least one opening, called the recovery opening, made in the peripheral wall of the reactor at the lower end of the downstream area, a combustion chamber separate from the reactor chamber, at least one ventilator to cause the gases to flow with the current of the biomass in the downstream area, and at least one opening, called the re-injection opening, made in the peripheral wall of the chamber at the upper end of the downstream area.

The combustion chamber advantageously includes at least one combination burner to burn simultaneously the gases recovered at the lower end of the downstream area, and solid material fuels.

In the embodiment of the reactor of the multiple-stage furnace type, the installation preferably includes at least one reinjection opening at each stage of the furnace in the downstream area.

To control the temperatures still better each reinjection opening is preferably made close to each heat pipe held in a fixed platform.

The installation advantageously includes a heat exchanger to allow the first fluid circuit to be heated by the second fluid circuit.

The invention also relates to a method for drying and torrefying biomass according to which the biomass is dried in an upstream area of a reactor chamber, and the biomass dried in an upstream area is transferred to a downstream area from the upstream area of the chamber of the same reactor, and the dried biomass transferred into the said downstream area is then torrefied, where the method includes the transfer of the dried biomass from the upstream area to the downstream area at time intervals, and sealing of one area relative to the other area during each time interval.

Advantageously, steam or air is made to flow, in the upstream area, against the current of the biomass and, simultaneously, in the downstream area, gases produced from the combustion of the gases recovered in this same area are made to flow with the current of the biomass.

Still more advantageously, when the supply of biomass to the reactor is discontinued, the flow of the combustion gases in the downstream area is continued.

Finally, the invention relates to the application of the reactor or of the method to the torrefaction of lignocellulosic biomass.

BRIEF DESCRIPTION OF THE ILLUSTRATIONS

Other advantages and characteristics of the invention will be shown more clearly on reading the detailed description of the invention given as an illustration, and not restrictively, with reference to the following figures in which.

DETAILED DESCRIPTION OF PARTICULAR EMBODIMENTS

In the following description the terms "input", "output", "upstream" and "downstream" are used with reference to the direction of transfer of the biomass which occurs vertically from top to bottom. Similarly, the terms "upper", "lower", "above" and "beneath" are used with reference to the vertical physical orientation of the reactor for drying and torrefying biomass according to the invention.

The reactor for drying and torrefying lignocellulosic biomass includes a single chamber 1 delimited at its cylindrical periphery by a lateral wall 10 and respectively above and beneath by two horizontal walls 11, 12.

Two separate areas 1A, 1B are delimited inside this chamber, namely upstream area 1A in the upper portion of the chamber, and downstream area 1B in the lower portion of the chamber.

Figure 1:
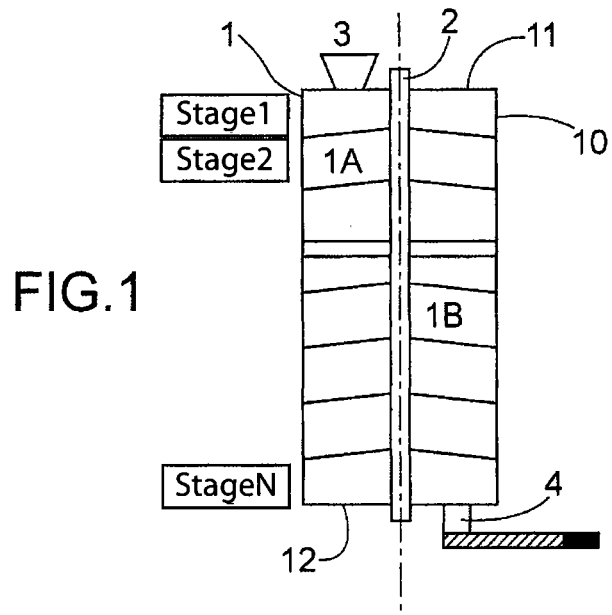
FIG. 1 is a schematic longitudinal sectional view of a reactor for drying and Torrefying biomass according to the invention.

As illustrated in FIG. 1, the reactor is of the multiple-stage furnace type, and therefore consists of a series of platforms Pi, also called hearths, fixed in chamber 1, which are vertically superposed relative to one another in vertical wall 10, which is advantageously a thermally insulated steel casing. Each fixed platform Pi defines a stage i.

The reactor includes means enabling the biomass to be mixed and transferred from one end of chamber 1 to the other. In this case a shaft 2, installed such that it can rotate in chamber 1 and aligned with the longitudinal axis of the furnace, supports arms equipped with multiple vanes also known by the term "rabble arm". These vanes or rabble arms enable the introduced biomass to be mixed and moved according to a spiral shape on each fixed platform, until this spiral shape encounters an aperture and falls onto the hearth below.

The biomass is thus introduced at the top of the reactor on to stage I by means of a feed lock 3 in upper horizontal wall 11. This lock 3 can be a double-valve system or any other system enabling the biomass to be introduced continuously whilst sealing is preserved.

The biomass introduced in this manner is stoked on stage I by means of the rabble arms until it passes through one of its openings, and is therefore transferred by gravity on to lower stage II. By this means the biomass is transferred from a given stage to the one immediately beneath it, moving from the upper end to the bottom of chamber 1, where it is extracted at outlet 4 (system for extracting the treated biomass).

The reactor for drying and torrefaction according to the invention includes in its upstream area 1A means enabling the biomass to be dried. With respect to drying, the temperature can be between 100° C. and 300° C., and more particularly between 100 and 200° C.

In its downstream area 1B, the reactor includes means allowing the biomass dried upstream to be torrefied. In this downstream area where the torrefaction proper takes place, the temperature reached is between 200 and 300° C., and preferably between 250 and 300° C. in the case of biomass of the wood type, and between 220 and 280° C. in the case of agricultural type biomass.

Figure 3:
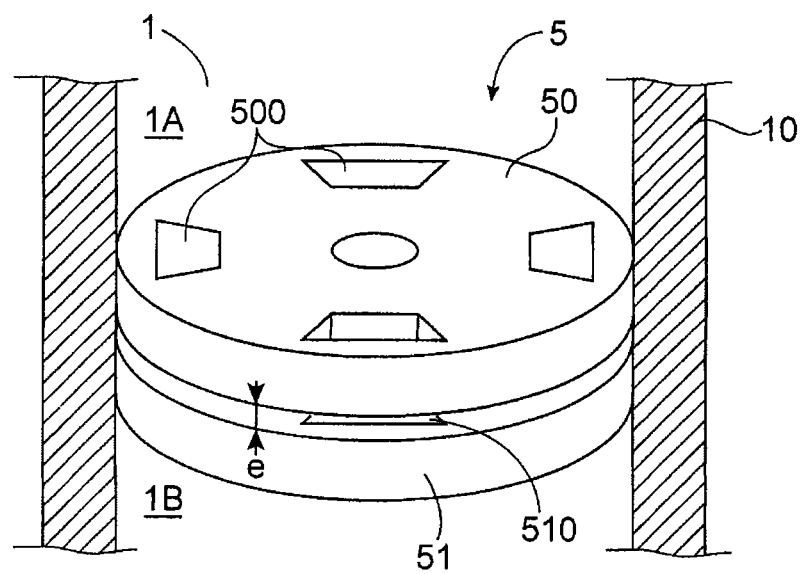
FIG. 3 is a schematic perspective view of an embodiment of the transfer and sealing system of the reactor according to the invention.

According to the invention, the reactor includes a transfer and sealing system 5 able to allow the dried biomass to be transferred from upstream area 1A to downstream area 1B at time intervals, and to make the two areas mutually sealed during each interval. In FIG. 3 an advantageous embodiment of this transfer and sealing system 5 has been represented. This is a rotary feeder 5 including:
  an upstream platform 50, fixedly mounted in chamber 1 and positioned at the lower end of upstream area 1A, and including multiple openings 500;
  a downstream platform 51, fixedly mounted on rotary central shaft 2 in the chamber and positioned at the upper end of downstream area 1B, and also including multiple openings 510. Each opening 500 of upstream platform 50 can face an opening 510 of downstream platform 51 at time intervals which are dependent on the speed of rotation of rotary shaft 2.

As illustrated, openings 500 and 510 are all identical, and are distributed in the same number on each platform 50, 51. Care is taken to minimise the distance, depending on the height of chamber 1, between fixed upstream platform 50 and rotary downstream platform 51. Indeed, minimising this distance enables the quantity of gas able to flow from upstream area 1A, where the drying of the biomass occurs, towards downstream area 1B, where the torrefaction proper occurs, and vice versa, to be minimised. This distance is preferably between 1 and 5 mm. It is self-evident that this distance depends on the biomass which must be treated: the larger the particles, the larger the distance can be. For example, the diameter of straw granules is rarely less than 6 mm, and therefore a distance separating the two platforms 50, 51 by at least 6 mm should be chosen if straw granules are to be treated.

At time intervals, which are preferably regular, when openings 500 of upstream platform 50 are facing, or in other words directly above those 510 of downstream platform 51, the dried biomass then falls under gravity from upstream platform 50 to downstream platform 51. It is self-evident that care is taken to make arms with vanes contribute to the mixing of the dried biomass on upstream platform 50. By this means the biomass flows through rotary feeder system 5 as defined only at predetermined time intervals, by this means limiting the communications between the gases of upstream area 1A (drying) and those of downstream area 1B (torrefaction) or, in other words, produces the gas-seal between the two areas 1A and 1B of the chamber in each time interval, i.e. when openings 500 of upstream platform 50 are not facing those 510 of the downstream platform 51.

As a result, it is advantageous if downstream platform 50 is supported by peripheral wall 10 of the furnace.

Care is taken to dimension this upstream platform 50 (its thickness and also the dimensions of openings 500) such that there is a determined flow rate of biomass transferred from upstream area 1A to the downstream area 1B. For example, with a sought flow rate of 3 t/h of torrefied biomass at outlet 4, corresponding to approximately 4 t/h of dried biomass entering area 1B, i.e. exiting upstream area 1A, rotary feeder 5 must be dimensioned to allow a flow rate of biomass equal to 66 kg/min. to be transferred.

Typically, in the case of a biomass of density equal to 300 $kg/m^3$, and supposing that feeder 5 includes:
  a fixed upstream platform 50 approximately 30 cm thick, with a number equal to eight openings 500,
  a rotary downstream platform 51 including the same number of openings 510 equal to those 500, and rotating at a speed of rotation equal to approximately 1 rpm (revolution per minute), a unit area per opening 500, 510 of the order of 1500 $cm^2$ must be chosen to allow at least 66 kg/min. to pass through. This unit area is the equivalent of a square with sides measuring 38.7 cm.

As indicated above, the speed of rotation of the shaft can be variable and modified depending on the flow rate of the biomass which it is sought to transfer through rotary feeder 5. Typically, speeds of rotation of central shaft 2 of between 0.2 and 2 rpm are envisaged.

An installation for drying and torrefaction incorporating a reactor according to the invention advantageously includes two independent fluid circuits C1, C2.

First fluid circuit C1 is the one which conveys the heat required for drying the biomass into upstream area 1A. According to the invention, heated air, as explained below, in heat exchanger 7, is injected in the lower end in an opening 60 traversing peripheral wall 10. By means of a ventilator 8 the air flows against the current with the biomass in upstream area 1A and is then discharged from this upstream area 1A to the atmosphere through opening 61, traversing peripheral wall 10 in its upper end.

Figure 2:
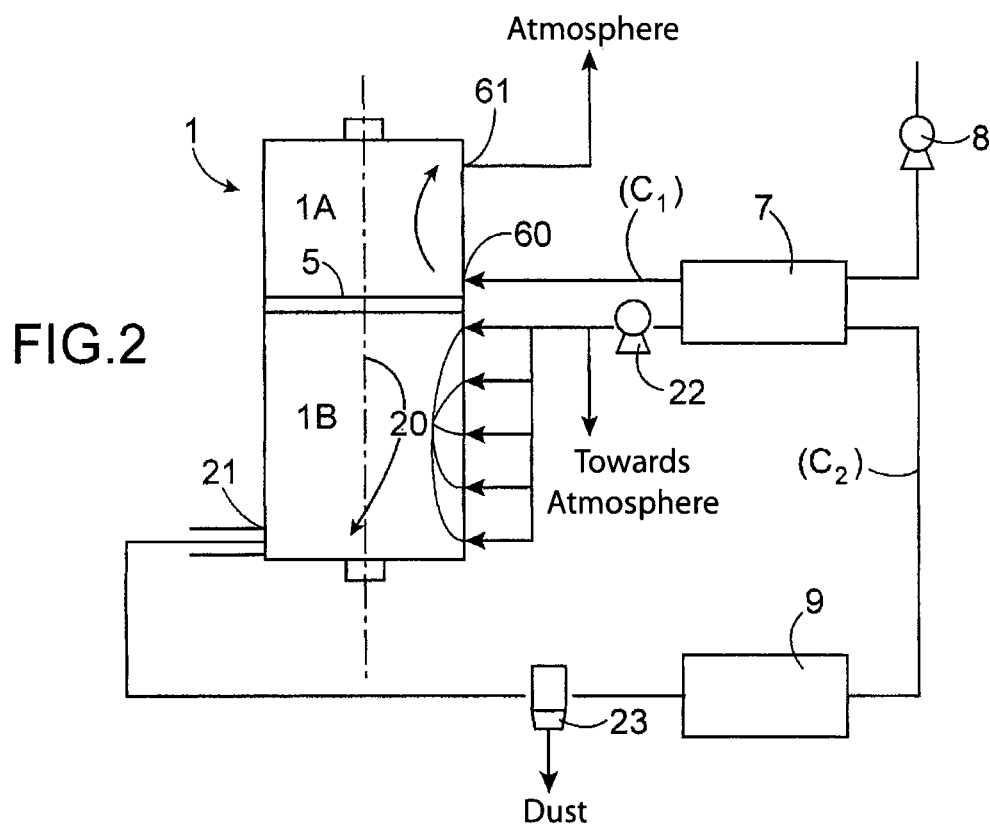
FIG. 2 is a schematic view showing an installation for drying and torrefying biomass incorporating the reactor according to the invention and including fluid circuits in accordance with the invention.

This flow of air heated to the drying temperatures typically of between 100 and 200° C., against the current of the biomass, which for its part is transferred vertically from top to bottom, is represented schematically by the curved arrow in area 1A of FIG. 2.

Second fluid circuit C2 is the one which conveys the heat required for torrefaction: this heat is transferred by the gases produced from a combustion chamber 9 separate from the chamber of reactor 1, after passing into heat exchanger 8. These gases flow in the oven with the current of the biomass, and are injected in each stage of the furnace in upstream area 1B of the reactor through an injection system 20. The flow of gases produced from combustion at torrefaction temperatures typically of between 200 and 300° C., with the current of the biomass, which for its part is transferred vertically from top to bottom, is represented schematically by the curved arrow in area 1B of FIG. 2.

An injection system 20 can consist of one or more openings made through peripheral wall 10 of the furnace of an aperture enabling the combustion gases to enter into downstream area 1B of the furnace. An injection system 20 can be provided at each stage of the multiple-stage furnace.

In this second fluid circuit, the smoke consisting of gases introduced into the furnace in downstream area 1B by injection system 20, and therefore at least those gases produced from combustion in combustion chamber 9, together with gases released by the biomass under the effect of the torrefaction heat treatment are recovered at the lower end of chamber 1 of the reactor. More accurately, an opening traversing peripheral wall 10 in final stage N, and preferably emerging in a conduit forming a vent 21, is installed. The smoke (gases) at the outlet of the furnace are made to flow by means of a ventilator 22, positioned downstream from heat exchanger 7, as shown in FIG. 2. By positioning the ventilator in this fashion it is prevented from being soiled by the tars present at the outlet of vent 21. Second fluid circuit C2 preferably includes, between vent 21 and combustion chamber 9, a cyclone separator 23 which enables all the large-size volatile particles, typically measuring several millimeters, which are likely to soil the facilities, to be eliminated. To prevent the condensation phenomena in the cyclone separator, it can advantageously be kept at high temperature by the smoke discharged into the atmosphere at the outlet of ventilator 22. In addition, the dust extracted in cyclone separator 23 can be exploited in combustion chamber 9 in the combination burner with the biomass. It is stipulated that a cyclone separator 23 includes one or more cyclones. These cyclones are, in the technological sense of the term, centrifugal particle separators: they enable a rotary movement to be induced in the gas. By centrifugal effect the particles in the gas will move towards the walls of the cyclone where they will be collected.

At the outlet of vent 21 the smoke is then directed towards combustion chamber 9, where its calorific capacity is exploited by combustion. This combustion chamber 9 advantageously includes at least one combination burner (unrepresented): by this means energy can be transferred by injection of an additional solid fuel material. This can be biomass or charcoal, coupled with an injection of combustion air. These solid fuels have the advantage that they are easy to store and transport, enabling the reactor according to the invention to be given energy independence when it is used as a torrefaction unit which can be transported to geographically isolated zones. Combustion chamber 9 can also be used as a post-combustion chamber if the legislation in force requires that the smoke is treated before being discharged into the atmosphere.

If, after being burnt in post-combustion chamber 9, the gases still contain compounds such as sulphur oxides or again acid gases and acid aerosols (HCl, HF, etc.), in quantities which do not comply with the legislation in force, one or more additional treatments is then envisaged. This/these additional treatment(s) can for example be a treatment with lime or with activated carbon (for desulphurisation) or neutralisation.

At the outlet of combustion chamber 9 the smoke is conveyed to heat exchanger 7, where it will provide the energy required for drying in upstream area 1A through the air flowing in first fluid circuit C1.

As shown in FIG. 2, a proportion of the smoke, at the outlet of heat exchanger 7, is then conveyed into injection system 20 present at each stage of downstream area 1B, i.e. the furnace's torrefaction area, and any remaining smoke there may be is directed to an appropriate treatment area, before being discharged into the atmosphere.

As mentioned above, to allow fine control of the temperature, and to homogenise the torrefaction area (downstream area 1B), injection system 20 enables a proportion of the torrefaction gases recycled by prior combustion to be injected into combustion chamber 9, preferably at each stage of the furnace.

Figure 4:
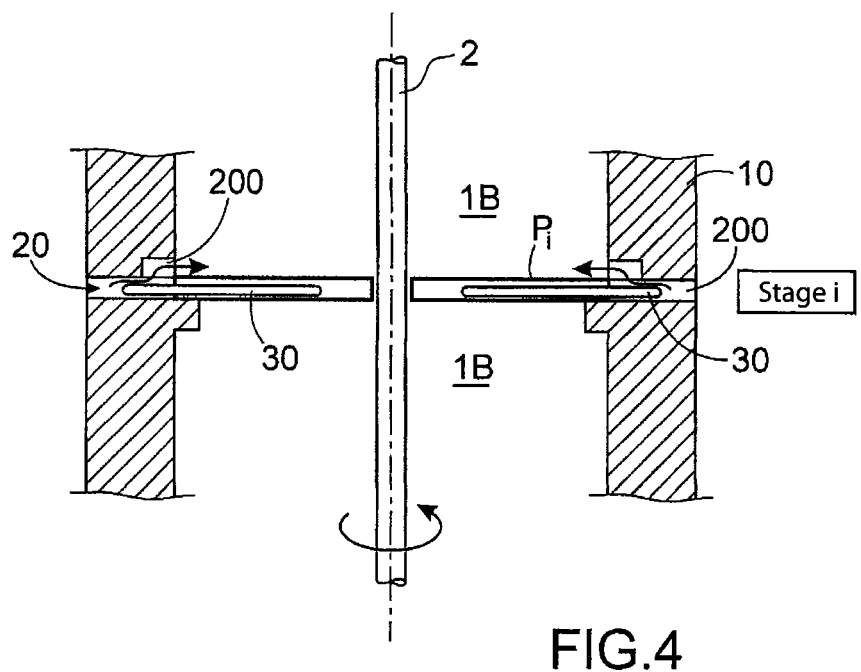
FIG. 4 is a schematic longitudinal sectional view in a stage of a reactor according to the invention consisting of a multiple-stage furnace.

To control the temperature still further, and to homogenise it, injection system 20 can advantageously be coupled with a heat exchange optimisation system. This consists of a heat pipe element connecting peripheral wall 10 of the furnace and each platform Pi defining a stage i of the furnace. Thus, as better illustrated in FIG. 4, at each stage i of area 1B of the furnace the combustion gases are injected through an opening 200 of the injection system close to a heat pipe element 30. By this means the gases are brought into contact with heat pipe 30 before being conveyed on to each platform Pi. To give the gases a tangential pulse at an injection opening 200, and by this means to facilitate the rotation movement in the furnace, it may be envisaged to implement additional means, such as an alignment determined as a result of injection opening 200, a lance or a metal plate forming a deflector.

Each platform Pi is thus heated by the hot gases arriving through an injection opening 200 at each stage i, which diffuses this heat towards the centre of the chamber of the furnace. By introducing heat pipe elements 30 at each stage i of the furnace the temperature of fixed platforms Pi can be kept constant and uniform. By this means the temperature of the gases and of the platforms is precisely controlled, and the heat exchanges with the particle bed of biomass being transferred are controlled and optimised by maximising the exchange surface.

With respect to the choice of heat transfer fluid of the heat pipes according to the invention, the inventors have made an inventory of those which are currently known. Table 2, a summary extract from publication [1], gives a comprehensive view. In connection with the invention, the inventors believe that Gilotherm® DO and Naphtalene are best suited for the operating conditions of the reactor according to the invention. Those skilled in the art can, of course, choose other heat transfer fluids in the heat pipes, with other chamber materials, depending on the envisaged applications (type of biomass to be treated).

The casing used of a reactor according to the invention is typically made of steel or stainless steel (304 L). With the heat transfer fluids envisaged for heat pipes according to the invention, heat exchanges by phase change are very superior to conventional conduction. Thus, as a comparison, copper, which is known to be a very satisfactory thermal conductor, has a thermal conductivity coefficient of the order of 360 W/m.° C., which does not enable heat flows to be attained in a ratio ten times lower than diphasic Naphtalene envisaged for the heat pipes according to the invention.

The length of heat pipes 30 positioned at each stage in platforms Pi length can be equivalent to the radius of the platform, and their diameter is preferably between 30 mm and 80 mm.

By virtue of heat pipes 30 and the controlled temperature increase coupled with optimisation of the related heat exchanges, the inventors believe that a substantially reduced residence time of biomass in the reactor can be envisaged. Indeed, the residence time/temperature pair determines the mass loss of solid material and the level of degradation of the compounds of the biomass.

An increase in the temperature thus enables the residence time to be reduced. In addition, when it is envisaged to feed in biomass continuously there must also be optimised heat exchanges, in order for the heat treatment to remain uniform in the context of a use with a high temperature and a short residence time.

Habitually, until the present time, residence times have typically been between 20 and 90 min., for torrefaction alone. The inventors believe that the residence time of the biomass for drying and torrefaction could be 10 to 30 min. in a reactor according to the invention.

Figure 5:
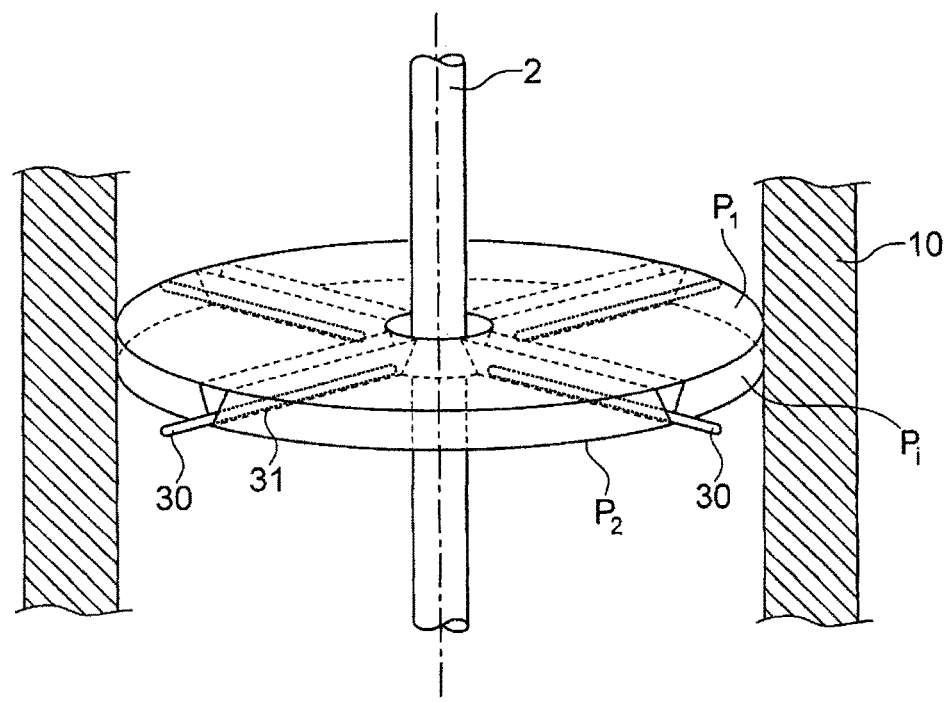
FIG. 5 is a schematic perspective view of a variant embodiment of a stage of a reactor according to the invention constituted by a multiple-stage furnace.

In FIG. 5 an advantageous assembly of several heat pipe elements 30 according to the invention, in a fixed platform defining a stage i of the reactor (multi-stage furnace) according to the invention, has been represented.

In the represented assembly a platform Pi consists of two plates P1, P2 separated from one another by a brace 31, the inner groove of which is V-shaped. The function of lower plate P2 is essentially to support the platform and heat pipes 30 on the furnace's peripheral wall.

As can be seen in this FIG. 5, there are heating means including four identical heat pipe elements 30, each positioned as a radius of plates P1, P2, and at 90° to another. Each heat pipe element 30 is inserted in a V-shaped groove of brace 31. By this means each heat pipe 30 can be assembled and disassembled easily. For temperature optimisation it may also be envisaged to add heat pipes in the furnace's peripheral wall. In this case the heat pipe elements can advantageously be positioned vertically between the reactor's casing and the thermal insulation habitually found at the rear. It may be envisaged to attach heat pipe elements using valve bridges screwed or welded on to the outside of the reactor's casing. It may also be envisaged to attach these heat pipe elements using a metal projection technique.

Such a technique, as with V-shaped grooves, enables a large thermal contact area and therefore heat exchange area to be provided between the heat pipe and platform elements.

The reactor for drying and torrefaction according to the invention which has been described has many advantages, allowing it to be used as a unit which can be transported to geographically isolated zones.

As an example, the inventors envisage, for a reactor according to the invention which can be used as a transportable torrefaction unit with a capacity of 3 t/h of torrefied biomass, a feed of between 1000 and 3000 kJ/kg of biomass, which enables a biomass to be produced with a lower calorific power of between 20 and 25 MJ/kg. This ratio obviously varies according to the initial moisture of the biomass and the capacity of the furnace.

Other embodiments may be envisaged without however going beyond the scope of the invention. Thus, although the number of platforms currently envisaged in a multiple-hearth type reactor according to the invention, as represented in FIG. 1, is two for the upstream area dedicated to drying, and four for the downstream area dedicated to torrefaction, i.e. a total number of six fixed platforms, a different number of fixed platforms can easily be envisaged. For example, if the biomass at the inlet has a very high moisture rate a higher number of platforms can be envisaged in the upstream drying area, typically a number equal to three.

The heat pipe elements according to the invention can be incorporated only in the downstream area dedicated to torrefaction, but they can also be incorporated in the upstream area dedicated to drying.

The reactor can by this means include heating means in the drying area or heating means in the torrefaction area, or heating means in the drying and torrefaction area.

It is envisaged, preferentially, to incorporate these heat pipe elements in the downstream area, since control of the torrefaction temperature is more important, as the torrefaction treatment is, by its nature, more sensitive to small variations in temperature than is the drying proper.

REFERENCES CITED

[1]: *Caloduc—Techniques de l'ingénieur* [B9 545]

The invention claimed is:

1. A reactor for drying and torrefaction, configured for torrefying biomass, the reactor comprising:
   a chamber within which two separate areas are delimited;
   means for mixing and transferring biomass from a first end of the chamber to a second end of the chamber;
   a drying device provided at an upstream area of the chamber, for drying the biomass introduced into the reactor;
   a torrefaction device provided at a downstream area of the chamber, for torrefying the biomass dried in the upstream area;
   a transfer and sealing system configured to transfer dried biomass from the upstream area to the downstream area at time intervals and to make the upstream and downstream areas mutually sealed during each interval; and
   a heating device in the upstream area or in the downstream area,
   wherein the heating device includes one or more heat pipes, to heat a fixed planar platform situated in the chamber, said fixed planar platform separating two stages of a multiple-stage furnace,
   wherein the heat pipes are arranged inside the chamber in the fixed planar platform, the heat pipes extending parallel to the fixed planar platform, and
   wherein the temperature in the upstream area of the chamber is between 100° C. and 200° C.

2. A reactor for drying and torrefaction according to claim 1, wherein each stage of the multiple-stage furnace is defined by a fixed platform including a transfer opening, wherein the means for mixing and transferring the biomass includes multiple arms including vanes configured to mix and move the biomass on each fixed platform along a spiral-shaped trajectory as far as the transfer opening through which the biomass can flow under gravity.

3. A reactor for drying and torrefaction according to claim 2, wherein the heat pipe is held inside a V-shaped groove made in at least one of the fixed platforms defining the stages of the furnace.

4. A drying and torrefaction reactor according to claim 3, wherein the fixed platform is formed from two plates superposed on one another and separated from one another by a V-shaped brace with an interior constituting the V-shaped groove.

5. A reactor for drying and torrefaction according to claim 1, wherein the transfer and sealing system is a rotary feeder including:
- an upstream platform, fixedly mounted in the chamber, and positioned at a lower end of the upstream area, and including a first transfer opening;
- a downstream platform, fixedly mounted on a rotary shaft, which is itself installed to rotate in the chamber, and positioned at an upper end of the downstream area, and including a second transfer opening;
- wherein the first transfer opening of the upstream platform can face the second transfer opening of the downstream platform at time intervals dependent on a speed of rotation of the rotary shaft.

6. A biomass treatment installation comprising a reactor according to claim 1, including a first fluid circuit, with an air or steam injection device, the injection device configured respectively to inject air or steam at a lower end of the upstream area, to cause injected air or steam to flow against a current of the biomass in the upstream area, to recover the injected air or steam at its upper end, and to discharge the recovered air or stream into the atmosphere.

7. A biomass treatment installation according to claim 6, wherein the injection device includes at least one injection opening, made in a peripheral wall of the reactor at a lower end of the upstream area, at least one ventilator configured to cause the air or injected steam to flow against a current of the biomass in the upstream area, and at least one opening, made in the peripheral wall of the reactor at the lower end of the upstream area.

8. A biomass treatment installation according to claim 6, further including a second fluid circuit with a gas recovering device, the gas recovering device configured respectively to recover gases at a lower end of the downstream area, to cause combustion of recovered gases, to reinject at least a proportion of combustion gases into the upper end of the downstream area, and to cause the gases to flow with a current of the biomass in the downstream area.

9. A biomass treatment installation according to claim 8, wherein the gas recovering device includes at least one recovery opening, made in a peripheral wall of the reactor at a lower end of the downstream area, a combustion chamber separate from the reactor chamber, at least one ventilator to cause the gases to flow with the current of the biomass in the downstream area, and at least one re-injection opening, made in the peripheral wall of the chamber at an upper end of the downstream area.

10. A biomass treatment installation according to claim 9, wherein the combustion chamber includes at least one combination burner to burn simultaneously the gases recovered at the lower end of the downstream area, and solid material fuels.

11. A biomass treatment installation according to claim 9, wherein at least one re-injection opening is provided at each stage of the furnace in the downstream area.

12. A biomass treatment installation according to claim 11, wherein each reinjection opening is made close to each heat pipe held in a fixed platform.

13. A biomass treatment installation according to claim 8, further including a heat exchanger to enable the first fluid circuit to be heated by the second fluid circuit.

14. A reactor for drying and torrefaction, configured for torrefying biomass, the reactor comprising:
- a chamber within which two separate areas are delimited;
- means for mixing and transfer biomass from a first end of the chamber to a second end of the chamber;
- a drying device provided at an upstream area of the chamber, for drying the biomass introduced into reactor;
- a torrefaction device provided at a downstream area of the chamber, for torrefying the biomass dried in the upstream area;
- a transfer and sealing system configured to transfer dried biomass from the upstream area to the downstream area at time intervals and to make the upstream area and downstream areas mutually sealed during this time interval; and
- a heating device in the upstream area or in the downstream area,
- wherein the heating device includes one or more heat pipes, to heat a fixed planar platform situated in the chamber, said fixed planar platform separating two stages of a multiple-stage furnace, and
- wherein the heat pipes are arranged inside the chamber and extend inside the planar platform, the heat pipes extending in a radial direction parallel to said planar platform.

15. A reactor for drying and torrefaction according to claim 5, wherein the downstream platform is positioned at an upper end of the downstream area directly below the upstream platform, wherein the first transfer opening of the upstream platform directly faces and is directly above the second transfer opening of the downstream platform at a predetermined time interval dependent on a speed of rotation of the rotary shaft, and where the upstream platform and the downstream platform are solid.

16. A reactor for drying and torrefaction according to claim 15, wherein the upstream platform includes four first transfer openings, and the downstream platform includes four second transfer openings.

17. A reactor for drying and torrefaction according to claim 14, wherein the transfer and sealing system is a rotary feeder including:
- a solid upstream platform, fixedly mounted in the chamber, and positioned at a lower end of the upstream area, and including a first transfer opening, and
- a solid downstream solid platform, fixedly mounted on a rotary shaft installed to rotate in the chamber, and positioned at an upper end of the downstream area directly below the upstream platform, and including a second transfer opening, and
- wherein the first transfer opening of the upstream platform directly faces and is directly above the second transfer opening of the downstream platform at a predetermined time interval dependent on a speed of rotation of the rotary shaft.

18. A reactor for drying and torrefaction according to claim 17, wherein the upstream platform includes four first transfer openings, and the downstream platform includes four second transfer openings.

* * * * *